Figure 1:
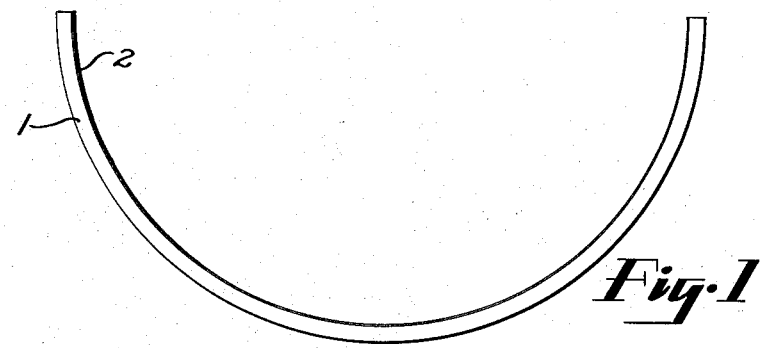

April 10, 1956    R. A. SCHAEFER    2,741,018
BEARING
Filed July 16, 1947

INVENTOR.
RALPH A. SCHAEFER
BY Fay, Golrick & Fay
ATTORNEYS

United States Patent Office 2,741,018
Patented Apr. 10, 1956

2,741,018
BEARING

Ralph A. Schaefer, Cleveland, Ohio, assignor to Clevite Corporation, a corporation of Ohio Application July 16, 1947, Serial No. 761,343

15 Claims. (Cl. 29—197)

The present invention, relating as indicated to bearings, is more particularly directed to an improved bearing for use in medium or heavy duty applications, such, for example, as in connecting rods and main bearings of internal combustion engines. The principal object of the invention is the provision of a bearing having improved operating characteristics over the present currently used types of bearings, and particularly as regards scuffing, scoring, seizing and embeddability. A further object of the invention is the provision of a bearing employing aluminum of certain aluminum alloys.

My invention relates more particularly to a bearing in which the main bearing layer is formed of a suitable aluminum alloy designed for bearing purposes but provided with means to prevent those difficulties which have been met with up to the present time in the use of aluminum as a bearing material. In general aluminum bearing alloys have under actual operating conditions behaved quite erratic so that they have enjoyed varying degrees of success. The most serious objection of their widespread adoption has been the tendency to scuff or to seize when operated under conditions where the lubrication is faulty or intermittent, where the shaft and bearing alignment is poor, or where there has been insufficient clearance between the bearings and the shaft at operating temperatures caused by the relatively high coefficient of expansion of aluminum alloys when compared to steel. The use of large clearances is frequently objectionable because the engine is too noisy when cold or must be operated at cooler oil temperatures to prevent seizure which is difficult to maintain under high power output. Such conditions are met with usually when there has been faulty alignment of the respective cooperating parts during assembly, leading to excessive distortion of the working parts and when a cold engine is started up where there is no lubricating film between bearing and shaft, at least immediately upon the starting. Under such conditions aluminum alloys tend to expand and then to scuff or seize and this has been found to be in many cases a serious fault with bearings of this type largely because of the activity of aluminum to form oxides on the surface which vary widely in adhesion and thickness.

I have found that these objectionable features of aluminum alloys can be overcome by providing them with a surface layer of a certain thickness formed of either copper-tin, lead-tin or lead-tin-copper.

To the accomplishment of the foregoing and related ends, the invention, then, consists of the structure hereinafter fully described and particularly pointed out in the claims; the annexed drawing and the following description setting forth in detail certain structures and methods of carrying out the invention, such disclosed structure and method illustrating, however, but one of various ways in which the principle of the invention may be used.

In said annexed drawing:
Fig. 1 is a side elevation of a semi-cylindrical bearing formed of an aluminum alloy and a surface layer; and
Fig. 2 is a similar view of the bearing embodying a layer of aluminum alloy secured to a bearing of stronger material and provided with a surface layer of another bearing composition.

It has been found that bearings formed of aluminum alloys will operate satisfactory without any backing layer of a stronger material under certain conditions and a bearing of this construction is illustrated in Fig. 1, in which a semi-cylindrical shell 1 of suitable aluminum alloy is shown provided with a layer of bearing material 2 of approximately .002" in thickness. In aluminum alloy bearings which are not provided with any supporting shell the aluminum is ordinarily in excess of ⅛ of an inch in thickness, since in this construction the aluminum is providing the rigidity for the entire bearing structure in the aluminum layer.

Figure 2:
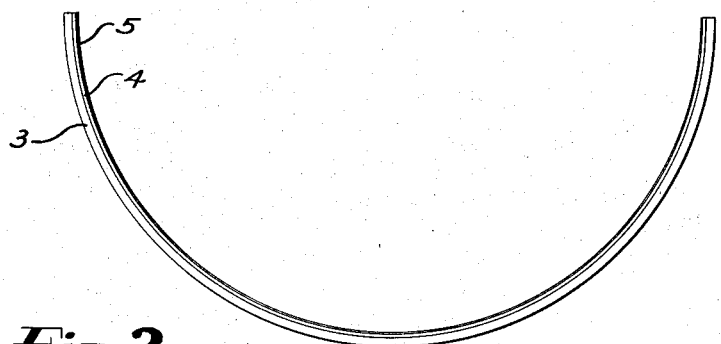

In Fig. 2 I have shown a bearing similar to that of Fig. 1, but formed of a supporting back or shell 3 of steel having secured to the inner surface thereof an aluminum alloy layer 4, which in turn is provided with a bearing layer 5 of approximately .002" in thickness and formed of either copper-tin or lead-tin or lead-tin-copper of the analyses hereinafter given. In bearings of the type shown in Fig. 2 the aluminum layer may of course be of very much less thickness than in the bearings of the type shown in Fig. 1 since in this bearing the steel backing layer supplies the rigidity and strength for the entire structure. In the bearings of both Figs. 1 and 2 the respective layers of material are uniformly and integrally bonded to each other throughout their engaging surfaces.

Various aluminum alloys may be used for the aluminum layer of the bearings in question and two compositions which have proven quite satisfactory are as follows:

| | Percent |
|---|---|
| Tin | 6.0 |
| Copper | 1.0 |
| Nickel | 1.0 |
| Titanium | 0.1 |
| Impurities | 1.5 |
| Balance aluminum. | |

A second alloy is composed of:

| | Percent |
|---|---|
| Tin | 6.0 |
| Copper | 1.0 |
| Nickel | 0.5 |
| Silicon | 2.5 |
| Impurities | 1.0 |
| Balance aluminum. | |

Both of these alloys have very good fatigue resistance but, as is the case with all of the currently used aluminum alloys, they possess poor surface characteristics and are extremely apt to scuff and seize under the conditions hereinbefore described.

I have found that it is possible to secure the advantages of aluminum as an intermediate bearing material with a thin overlay plate of a relatively thin layer of either copper-tin, lead-tin, or copper-tin-lead onto the inner running surface of the aluminum shell. If copper and tin are used the composition is approximately 3% copper and 97% tin. The tin-copper-lead composition is approximately 10% tin, 3% copper and 87% lead. The engineering advantages of aluminum as an intermediate are due largely to its high fatigue and corrosion resistance under operating conditions as a bearing material.

It will be evident that the physical dimensions of the various layers in the bearing of both Figs. 1 and 2 will be determined by the requirements to be met with for any given use of a bearing, but in all applications improved results are secured if the surface bearing layer is maintained in an extremely thin film and does not exceed approximately .002" in thickness.

A function of the surface layer is to provide a layer to be engaged by the rotating shaft which shall have extremely good running properties as a bearing, that is of a composition which will not tend to score or seize and which will have the properties possessed by lead and tin to a greater extent than by other metals of apparently being self-healing as regards small cracks, scores and the like. In a thickness of approximately .002" or less which I propose to use, this surface layer in extreme cases may be largely worn off in the bearing operation without apparently affecting the successful operation of the bearing proper, while in other cases the surface layer has been found to remain in substantially its original condition on the aluminum over long periods of time.

As an example of the performance secured by a bearing of the type described I have operated a bearing consisting of aluminum without any steel shell but carrying approximately a .001" surface layer of a composition of approximately 8% tin and 92% lead throughout a run exceeding 490 hours in length at a speed of 4200 R. P. M. and under a load of 3600 pounds per square inch. At the conclusion of this run the bearing in question was examined and found to have worn less than .0004 and there were no signs of fatigue or other unusual conditions indicating the likelihood of any early failure of the bearing.

The present invention may of course be embodied in various types of bearings, that is, in semi-cylindrical or cylindrical bearings, or, if desired, in flat form and as used herein the term "backing" as applied to the steel layer of such a bearing will be understood to mean such a backing either in cylindrical, semi-cylindrical or flat form throughout.

Babbitt as here used in intended to include bearing compositions having either lead or tin in predominant amount and other metals capable of being plated simultaneously with the lead or tin.

I claim:

1. A bearing consisting of a steel shell, an aluminum alloy layer of substantial thickness integrally bonded to said steel shell, and a layer of a bearing composition bonded to the exposed surface of said aluminum alloy layer approximately .002" thick and composed of an alloy containing approximately 3% copper and 97% tin.

2. A bearing comprising in combination a shell of substantial thickness of an aluminum alloy having bearing characteristics and a layer of a bearing composition approximating .002" in thickness integrally secured to one surface of said aluminum alloy shell and consisting of approximately 3% copper and 97% tin.

3. A bearing comprising a shell of substantial thickness of an aluminum alloy having bearing characteristics and a layer of bearing alloy consisting of tin in predominant amount approximately .002 inch in thickness integrally bonded to said aluminum alloy shell.

4. A composite bearing comprising an aluminum alloy layer having good bearing properties and including aluminum as a major portion, and a bearing layer not greater than .002" in thickness and bonded to the aluminum layer and consisting of a tin base babbitt alloy having tin in predominant amounts.

5. A composite bearing comprising, in combination an aluminum alloy layer having good bearing properties and including aluminum as a major portion, and a bearing layer not greater than .002" in thickness and bonded to the aluminum layer and consisting of a tin base babbitt alloy wherein the tin is approximately 97% of the alloy and copper 3%.

6. A composite bearing comprising, in combination an aluminum alloy layer having good bearing properties and including aluminum as a major proportion, and a bearing layer from .001 inch to .002" in thickness and bonded to the aluminum layer and consisting of a bearing alloy having in predominant proportion a metal of the group consisting of lead and tin.

7. A composite bearing as claimed in claim 6, wherein the aluminum alloy is bonded to a steel backing member.

8. A bearing consisting of a steel shell, an aluminum alloy layer of substantial thickness integrally bonded to said steel shell, and a layer of a bearing composition bonded to the exposed surface of said aluminum alloy layer from .001 inch to .002 inch thick, and composed of an alloy containing approximately 3% copper and 97% tin.

9. A bearing comprising in combination a shell of substantial thickness of an aluminum alloy having bearing characteristics and a layer of a bearing composition from .001 to .002 inch in thickness integrally secured to one surface of said aluminum alloy shell and consisting of approximately 3% copper and 97% tin.

10. A bearing including a shell of substantial thickness of an aluminum alloy having bearing characteristics and a layer of bearing alloy consisting of tin in predominant amount from .001 inch to .002 inch in thickness integrally bonded to said aluminum alloy shell.

11. The bearing of claim 6, in which the lead in the bearing alloy is in predominant proportions.

12. The bearing of claim 6, in which the alloy has a composition of approximately 10% tin, 3% copper and 87% lead.

13. The bearing of claim 6, in which the composition has approximately 8% tin and 92% lead.

14. A composite bearing comprising, in combination an aluminum alloy layer having good bearing properties and including aluminum as a major portion, and a bearing layer not greater than .002" in thickness and bonded to the aluminum layer and consisting of a lead base babbitt alloy having lead in predominant proportions.

15. A composite bearing comprising, in combination an aluminum alloy layer having good bearing properties and including aluminum as a major portion, and a bearing layer not greater than .002" in thickness and bonded to the aluminum layer and consisting of a bearing alloy having in predominant proportion a metal of the group consisting of lead and tin.

References Cited in the file of this patent

UNITED STATES PATENTS

| | | |
|---|---|---|
| 2,170,039 | Steudel | Aug. 22, 1939 |
| 2,277,023 | Steiner | Mar. 17, 1942 |
| 2,316,119 | Bagley | Apr. 6, 1943 |
| 2,329,483 | Queneau et al. | Sept. 14, 1943 |
| 2,426,940 | McCullough | Sept. 2, 1947 |

FOREIGN PATENTS

| | | |
|---|---|---|
| 525,076 | France | Sept. 15, 1921 |
| 706,655 | Germany | May 31, 1941 |

OTHER REFERENCES

Bearing Metals and Bearings, by W. M. Corse, published 1930.